F. J. GRUMME.

WIRE BOUND BOX BLANK MACHINE.

APPLICATION FILED DEC. 22, 1919.

Reissued Sept. 28, 1920.

14,951.

4 SHEETS—SHEET 1.

INVENTOR

Frederick J. Grumme

BY Edward F. Grumme Jr.

his ATTORNEY

F. J. GRUMME.

WIRE BOUND BOX BLANK MACHINE.

APPLICATION FILED DEC. 22, 1919.

Reissued Sept. 28, 1920.

14,951.

4 SHEETS—SHEET 2.

INVENTOR

Frederick J. Grumme

BY Edward F. Dumme Jr.

his ATTORNEY

F. J. GRUMME.

WIRE BOUND BOX BLANK MACHINE.

APPLICATION FILED DEC. 22, 1919.

Reissued Sept. 28, 1920.

14,951.

4 SHEETS—SHEET 3.

INVENTOR

Frederick J. Grumme

BY Edward Grumme Jr., his ATTORNEY

F. J. GRUMME.

WIRE BOUND BOX BLANK MACHINE.

APPLICATION FILED DEC. 22, 1919.

Reissued Sept. 28, 1920.

14,951.

4 SHEETS—SHEET 4.

INVENTOR

Frederick J. Grumme.

BY Edward Grumme Jr.

his ATTORNEY

UNITED STATES PATENT OFFICE.

FREDERICK J. GRUMME, OF INDIANAPOLIS, INDIANA, ASSIGNOR, BY MESNE ASSIGNMENTS, TO WIREBOUND PATENTS COMPANY, A CORPORATION OF MAINE.

WIRE-BOUND-BOX-BLANK MACHINE.

14,951. Specification of Reissued Letters Patent. Reissued Sept. 28, 1920.

Original application filed August 8, 1913, Serial No. 783,725. Renewed May 31, 1917, Serial No. 172,075. Original No. 1,253,962, dated January 15, 1918. Application for reissue filed December 22, 1919. Serial No. 346,788.

*To all whom it may concern:*

Be it known that I, FREDERICK J. GRUMME, a citizen of the United States, residing at Indianapolis, in the county of Marion and State of Indiana, have invented a new and useful Wire-Bound-Box-Blank Machine, of which the following is a specification.

The object of my invention is to produce a machine by means of which box blanks, composed of cleats and sheet material, may be associated in such manner that the same may be folded to form the sides of a box.

Figure 1:
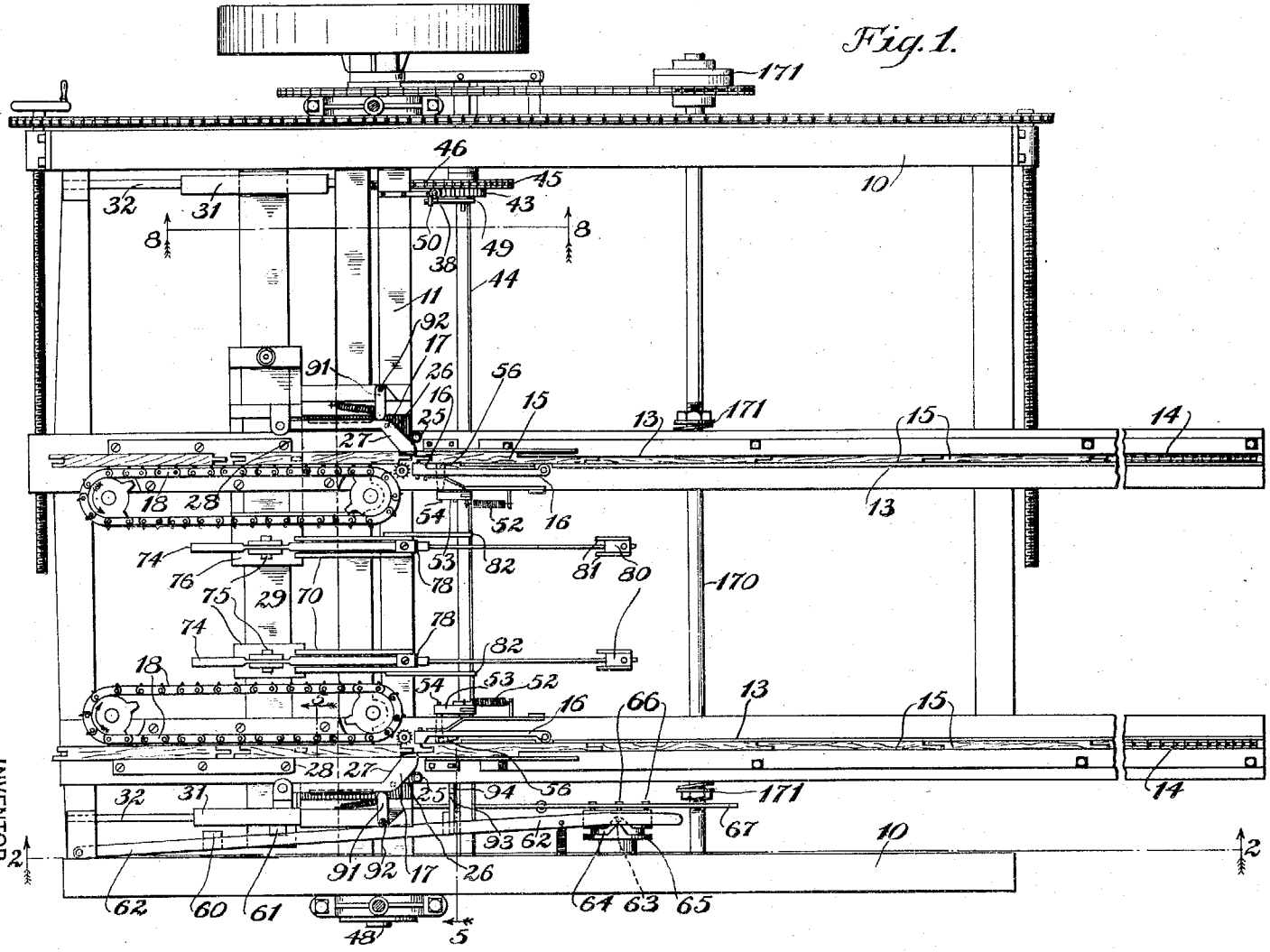
Figure 2:
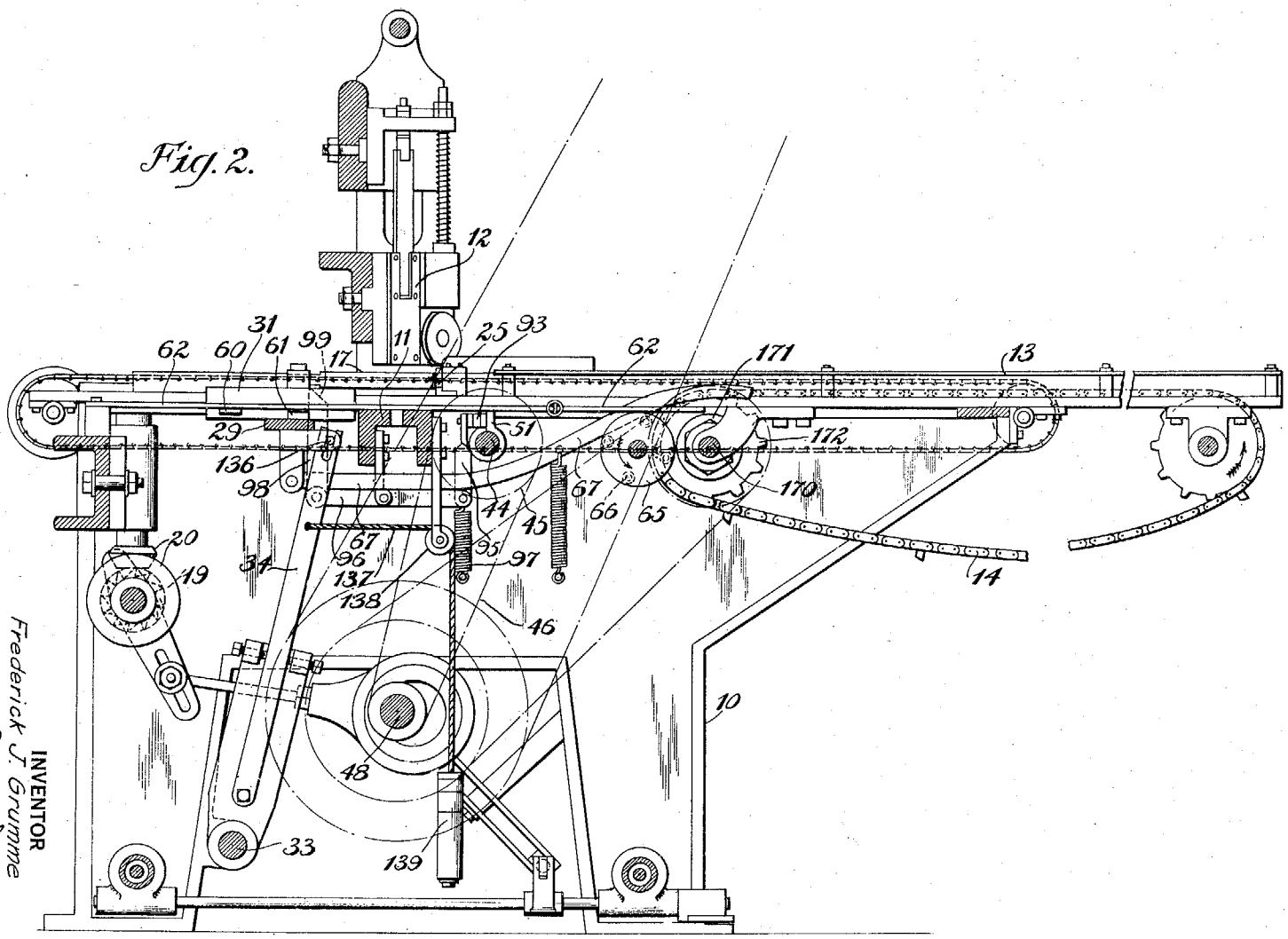
Figure 3:
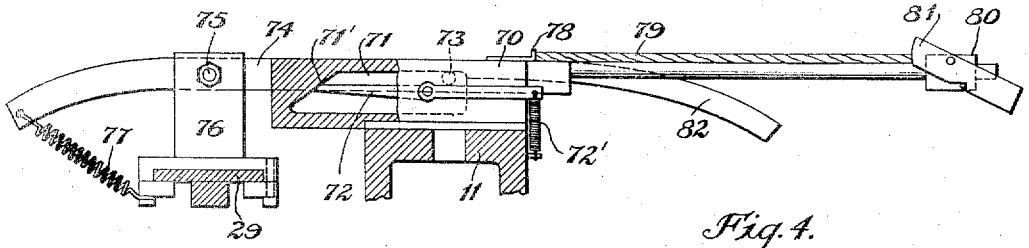
Figure 4:
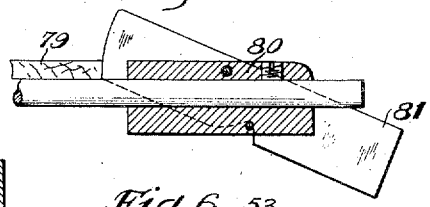
Figure 5:
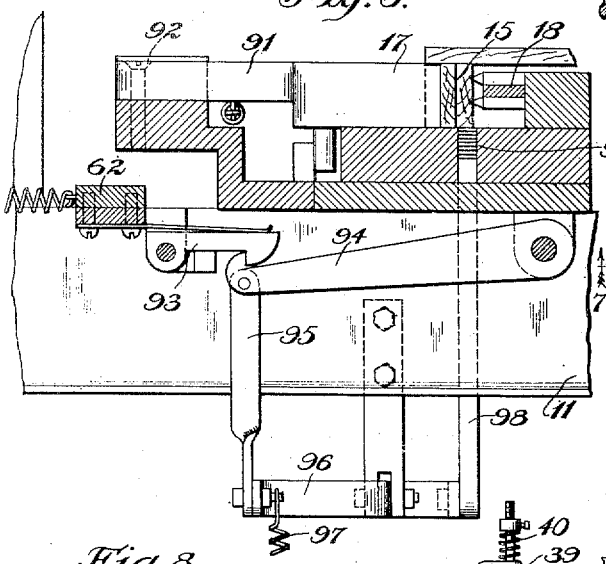
Figure 6:
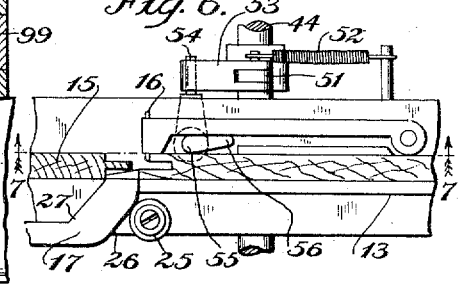
Figure 7:
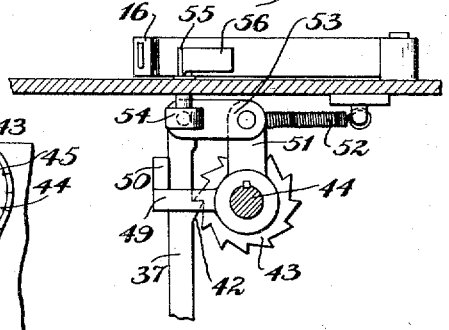
Figure 8:
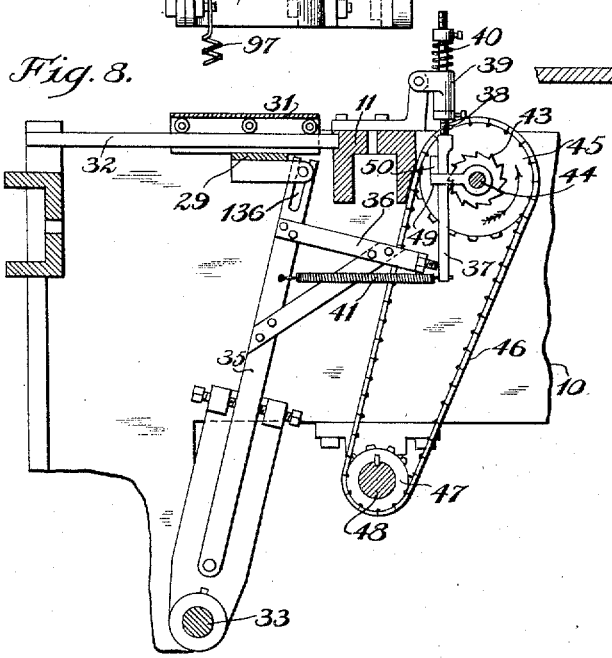
Figure 9:
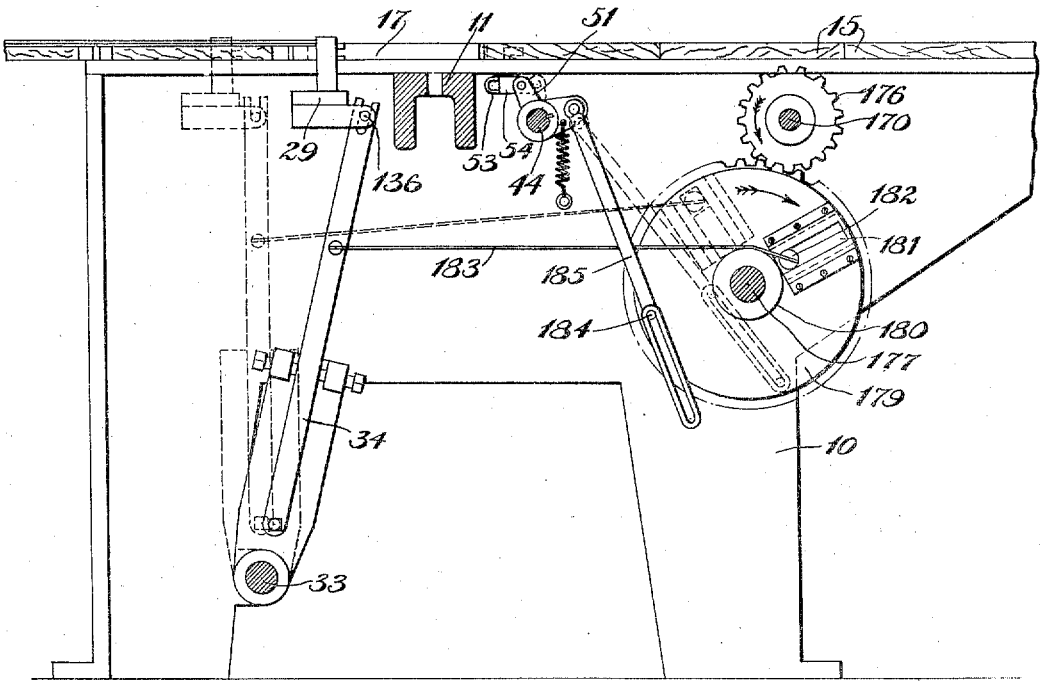
Figure 10:
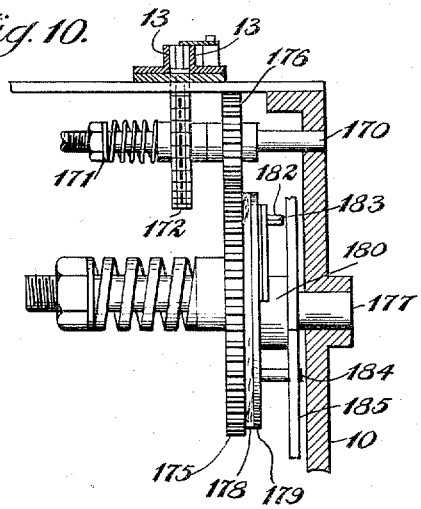

The accompanying drawings illustrate my invention as incorporated in a machine especially designed for the production of wire bound box blanks wherein the several sections of each box blank are connected and strengthened by binding wires, Figure 1 being a plan with the usual staple-forming and driving mechanism omitted; Fig. 2 a vertical section on the line 2—2 of Fig. 1; Fig. 3 a fragmentary vertical section showing the sheet gaging and feeding mechanism; Fig. 4 a fragmentary detail of the right-hand end of the structure shown in Fig. 3; Fig. 5 a section, on a larger scale, on line 5—5 of Fig. 1; Fig. 6 a fragmentary plan of the cleat interrupter and spacer; Fig. 7 a section on line 7—7 of Fig. 6; Fig. 8 a section, on line 8—8 of Fig. 1; Fig. 9 an elevation of another form of mechanism for withdrawing the cleat-interrupter; and Fig. 10 a detail of the parts shown in Fig. 9.

In the drawings, 10 indicates the main frame of a machine provided with the usual anvil bar 11, stapling mechanism 12 arranged above the anvil bar, and cleat guides 13, 13 arranged to deliver a succession of cleats to the stapling plane and each provided with a friction-driven feed chain 14 adapted to yieldingly deliver cleats 15 through the cleat guides to the interrupter 16 which operates upon each cleat in succession to temporarily detain it to permit the insertion between the forward end of the oncoming cleat and the rear end of the preceding cleat, of a cleat-spacing member 17, the preceding cleats being under the control of the spaced-cleat feeder chains 18 which last-mentioned chains are given step-by-step advancement by means of the ratchet mechanism 19 and connecting gear train 20 connecting said ratchet mechanism with the feed chains in a manner so well known to the art as to need no further illustration.

Thus far the mechanism which I have described is common and well known, being illustrated more fully in Patent No. 985,996, issued March 7, 1911, to Jason H. Greenstreet. In the operation of the mechanism just described, the spacing members 17 are moved into the space between cleats by the action of the pin 25 upon the cam face 26 of the spacer fingers 17 and said spacers are automatically withdrawn from between the cleats, after the rearward cleat has passed under the control of the cleat feeder 18, by the action of the cam face 27 upon the pin or stop 28, and in the present form of machine these cleat spacers 17 are carried by a cross bar 29 supported by cross heads 31 upon the longitudinal guide bars 32 so that the cross bar 29 has a limited play lengthwise of the machine.

Arranged in frame 10 is a rock shaft 33 provided with a pair of upwardly extending arms 34, 35 each of which is connected by a pin and slot connection 136 with the cross bar 29. Attached to the arm 34 is a cord 137 which is passed over an idler 138 and provided at its lower end with a weight 139 which normally tends to keep the cross bar 29 in its position closest to the stapling plane. The arm 35 is provided with a rearward extension 36 adapted to intermittently engage with the lower end of a pawl 37 which is carried by a stem 38 vertically reciprocable through a pivoted bracket 39 and normally held in its upper position by a spring 40. Connecting arm 35 with the lower end of pawl 37 is a spring 41 the pull of which normally withdraws the shoulder 42 of pawl 37 from the path of movement of the teeth of a constantly rotating ratchet wheel 43 which is freely rotatable upon the rock shaft 44, the ratchet wheel being carried by a sprocket wheel 45 driven by a chain 46 connecting it through sprocket wheel 47 with a constantly rotating shaft 48. Rock shaft 44 carries a radially projecting arm 49 which lies within the path of movement of a finger 50 carried by the pawl 37. Shaft 44 also carries arms 51 to which are connected springs 52 which serve to normally hold the parts in the position shown in Fig. 7. Connected to arms 51 are links 53 which in turn are connected to arms 54 carried by rock shafts 55 which are provided at their upper ends with arms 56 adapted to engage the interrupter 16 and intermittently retract it from cleat-interrupting position, this retraction taking place on the return of bar 29 to the position shown in Fig. 1.

The retracting operation of the interrupter finger 16 is accomplished as follows:—Normally, shoulder 42 of pawl 37 lies out of the path of movement of the constantly moving ratchet wheel 43 but as soon as bar 29 returns to the position shown in Figs. 1 and 8 the bracket 36 of arm 35 engages pawl 37 so as to move shoulder 42 into the path of movement of ratchet 43 whereupon said ratchet serves to drive the pawl 37 quickly downwardly. This downward movement of the pawl 37 brings its finger 50 into engagement with arm 49 of shaft 44, thereby producing a short rocking movement of shaft 44 and, through its arms 51 and links 53 operating upon arms 54 of shafts 55 and causing the arms 56 thereof to engage the cleat interrupters 16 and withdraw them from in front of the oncoming cleats.

It is desirable immediately following the production of a complete blank, to interrupt the flow of cleats for the next blank just before the cleats pass into the control of the positive cleat feeder 18 and for that purpose I provide a stop 60 which is automatically intermittently moved into the path of movement of a finger 61 carried by the cross bar 29. In the production of a four-sided box blank, this operation occurs once in the flow of each four cleats. Stop 60 is carried by a swinging arm 62 provided with a pin 63 lying in a cam groove 64 in a rotating cam 65, which cam is provided with a series of pins 66 (four in the present instance) arranged to be engaged by a pawl 67 carried by cross bar 29. The main portion of cam groove 64 is such as to normally hold stop 60 out of the path of movement of stop 61 but at one point, as clearly shown in Fig. 1, this cam groove is formed so as to produce a swing of arm 62 so as to bring stop 60 into the path of movement of stop 61.

Thus far the machine, while differing in some minor details from the Greenstreet machine to which I have already referred, is, nevertheless, substantially the same as that machine, and my invention relates more particularly to the apparatus which I shall now describe.

Supported upon the anvil bar 11 are guides 70 each of which is provided with a run-way 71 in which is mounted a switch arm 72. The run-way 71 is formed to receive pin 73 carried by a swinging arm 74 pivoted at 75 upon a bracket 76 mounted upon cross bar 29 and longitudinally adjustable thereon, the arm 74 being normally held in its upper position, as shown in Fig. 3, by a spring 77. Each arm 74 carries a sheet gage 78 against which the forward edge of the sheet material 79 may be placed and each arm also carries at its rear end an adjustable block 80 which may be adjusted toward and from gage 78, and carries vertically swinging pawls 81 adapted to engage the rear edge of the sheet 79 but arranged to pass freely beneath the sheet on the return or rearward movement of arm 74. Projecting rearwardly from each guide 70 is a sheet supporting finger 82.

By this arrangement the sheet material is positively fed through the machine in synchronism with the cleats, the movement of this sheet feeding and gaging mechanism being dependent upon the movement of the cross bar 29 which is moved forwardly by the action of the spaced cleats upon the cleat spacer 17 and as the end of this sheet feeding movement is neared, and after the first staple has been driven through the oncoming sheet into the cleat beneath, pin 73 reaches the cam surface 71′ of the cam slot 70 and passes beyond and beneath switch 72 whereupon, the switch being returned by a spring 72′, pin 73 in its return movement passes beneath switch 72 until the rear end of the stroke is reached, thus depressing the rear end of arm 74 and keeping the pawl 81 and gage 78 from dragging upon the under side of the sheet material.

In the operation of machines of this type, there is at times some difficulty in the return movement of the cleat spacer 17 and for that purpose I arrange, adjacent the path of movement of such cleat spacer, a spring-urged presser arm 91 which is pivoted at 92 on the main frame and serves to insure the proper projection of the cleat spacer between the separated cleats, as shown in Fig. 2.

In order that the arm 62 may be locked in its abnormal position for a required length of time, so as to give proper spacing between blanks, I mount upon the under side of said arm 62 a pawl 93 which is adapted to be engaged by a catch 94 when arm 62 is thrown to its abnormal position. In order to withdraw catch 94 at the proper time, said catch is connected by a link 95 with a lever 96 which is normally urged toward retracting position by a spring 97. Lever 96 is connected to a vertically moving cam bar 98 which is projected upwardly into the bottom of one of the cleat guides just beyond the stapling plane, the rear face of the projecting end being beveled, as indicated at 99, so that the forwardly moving cleats may pass freely over the upper end of the cam bar, depressing it below the cleat guide. By this arrangement, whenever the last cleat of a series passes beyond the cam bar 98, it will be permitted to rise, and will thus withdraw catch 94 from engagement with catch 93, and thus permit arm 62 to return to its normal position and withdraw stop 60 from the path of movement of stop 61 and thereby permit a resumption of flow of the cleats through the machine.

With the construction shown in Fig. 2, for returning the arms 34 and 35 to their rearward position by the weight 139, some difficulty has been found, owing to the jar of the weight, and it has not been found feasible to directly operate the withdrawing means for the cleat interrupters by this return movement and it is for that reason that the construction shown in Fig. 7 is provided. I have found, however, that by the construction shown in Fig. 9, it is possible to directly operate the withdrawing means for the cleat interrupters by mechanism which is directly connected with the returning mechanism for the cross bar 29, this apparatus being also of such character as to effect a variable pull upon the cross bar at different points in its movement and thus do away with the jar incident to the use of a weight of sufficient size to accomplish desired results.

In this construction I provide the shaft 170, which is a constantly rotating shaft acting by friction elements 171 upon the sprocket wheels 172 which carry the preliminary feed chains 14. Upon this constantly moving shaft 170 I mount a gear 176 which meshes with a gear 175 mounted upon a stud shaft 177. Gear 175 carries a friction element 178 which frictionally engages an oscillating disk 179 journaled on the stud shaft 177 and carrying a drum 180 of smaller diameter. Extending radially from the periphery of this drum within disk 179 is a slot 181 within which is slidably mounted a pin 182. Secured to this pin is a flexible link or thong 183, the opposite end of which is attached to one of the arms 34 or 35. The disk 179 at one point is provided with a pin 184 upon which rides an arm 185 carried by the rock shaft 44, said rock shaft carrying only the arms 51 and links 53 which connect with the levers 54.

By this arrangement the pin 182 lies close to the circumference of drum 180 when the parts are in the position shown in full lines, and at this time the arms 34 and 35 are in the position shown in Fig. 2, the cross bar 29 being at the rear end of its stroke; *i. e.*, nearest the stapling plane. When the cross bar 29 is driven forwardly in the machine, by the action of the cleats on the cleat-spacers 17, the disk 179 will be dragged back against the action of its friction driving means to the position indicated in dotted lines in Fig. 9, this movement dragging pin 182 to the outer end of slot 181 where the effect of the friction drive upon the disk is the least upon the arms 34, 35. As soon as the cleat spacers 17 have been drawn out from between the cleats by the action of the cam 28, the friction action of the element 178 upon disk 179 returns it to its initial position (moving in a clockwise direction in Fig. 9) and as the movement of this disk nears its end, there will be a slip of pin 182 inwardly in slot 181 so as to thus increase the driving effect of the friction element 178 upon the arms 34, 35, and consequently increase the driving force upon the cross bar 29, thereby giving greater force, although acting at a slower speed, upon the cleat spacers 17 to drive them against the pins 25 and force the cleat spacers into the cleat guides in front of the interrupted cleat. Just as this final movement of the disk 179 takes place, pin 184 engages the upper end of a slot formed in arm 185 so as to permit a rocking of shaft 44 and a consequent operation of the cams 56 to withdraw the interrupters 16. It will be seen that by this arrangement the speed of return of the cross bar 29, close to the end of the return movement, is lessened, as distinguished from the greater speed produced by the falling weight in the structure shown in Fig. 2, and consequently by this arrangement I avoid the jar which is incident to the operation of the weight.

I claim as my invention:

1. The combination, with a cleat guide, stapling mechanism, and means for feeding cleats through the guide across the stapling plane, of a sheet-driving member independent of the cleat-feeding means and reciprocable longitudinally relatively to the cleat movement, and means for shifting said sheet-driving member into and out of the plane of movement of sheet material associated with cleats in the cleat guide.

2. The combination, with a cleat guide, stapling mechanism, and means for feeding cleats through the guide across the stapling plane, of a cleat-engaging member associated with the cleat-guide, a reciprocating carrier for said cleat-engaging member, a sheet-driving member carried by said carrier, and means operating on said sheet-driving member to shift it into and out of the plane of movement of sheet material associated with cleats in the cleat guide.

3. The combination, with a cleat guide, stapling mechanism, and means for feeding cleats through the guide across the stapling plane, of a preliminary cleat feeder preceding the main cleat feeder, an interrupter arranged to successively engage the cleats prior to engagement by the main cleat feeder, a cleat spacer movable into the cleat guide in front of an interrupted cleat and withdrawable from the cleat guide beyond the initial end of the main cleat feeder, a carrier for said cleat spacer, a sheet-driving member carried by said carrier, and means operating on said sheet-driving member to shift it into and out of the plane of movement of sheet material associated with cleats in the cleat guide.

4. The combination, with a cleat guide, stapling mechanism, and means for feeding cleats through the guide across the stapling plane, of a preliminary cleat feeder preceding the main cleat feeder, an interrupter arranged to successively engage the cleats prior to engagement by the main cleat feeder, a cleat spacer movable into the cleat guide in front of an interrupted cleat and withdrawable from the cleat guide beyond the initial end of the main cleat feeder, a carrier for said cleat spacer, a rearwardly projecting arm pivoted on said carrier, a sheet-driving member carried by said arm, and a cam arranged to operate on said arm during its reciprocation by the carrier to shift the sheet-driving member into and out of the plane of the sheet.

5. The combination of a reciprocating element, a rotary element, an oscillating element associated with the rotary element, a frictional driving connection between the rotary element and the oscillating element, a radial guide carried by the oscillating element, a pin slidably mounted in said guide, and a connecting link between said pin and the reciprocating element.

6. The combination with a cleat guide, stapling mechanism, and means for feeding cleats through the guide across the stapling plane, of a cleat spacer arranged adjacent the guide and movable into the cleat guide behind a cleat, of a carrier for said cleat spacer, a rotary frictional driving element, an oscillating member frictionally engaged by said driving element, an inclined guide carried by said oscillating member, a pin mounted in said guide and movable therein toward and from the center of oscillation, and a connection between said pin and the cleat-spacer-carrier.

7. The combination with a cleat guide, stapling mechanism, and means for feeding cleats through the guide across the stapling plane, of a cleat spacer arranged adjacent the guide and movable into the cleat guide behind a cleat, of a carrier for said cleat spacer, a rotary frictional driving element, an oscillating member frictionally engaged by said driving element, an inclined guide carried by said oscillating member, a pin mounted in said guide and movable therein toward and from the center of oscillation, a connection between said pin and the cleat-spacer-carrier, a preliminary cleat feeder, a cleat interrupter movable into and out of the path of cleats driven by said preliminary cleat feeder, and means for withdrawing said interrupter from the cleat guide, said means comprising a member carried by the oscillating member, and a connector engaging said last-mentioned member.

8. The combination with a cleat guide, stapling mechanism, and means for feeding cleats through the guide across the stapling plane, of a cleat spacer arranged adjacent the guide and movable into the cleat guide behind a cleat, a reciprocating carrier for said cleat spacer, and means for returning said carrier in a direction opposite to its movement produced by the moving cleats, said means comprising a motor member the effect of which upon the carrier decreases the speed of the carrier as it nears its extreme return position.

9. A machine for use in making wire-bound cleat reinforced boxes comprising, in combination, fastener-setting mechanism for securing binding wire to a succession of box sections progressively subjected to the action thereof; means to space successive sections; means for feeding cleats; and a separate and independent positive sheet feeding means.

10. A machine for use in making wire-bound cleat reinforced boxes comprising, in combination, fastener-setting mechanism for securing binding wire to a succession of box sections progressively subjected to the action thereof; means to space successive sections; means for feeding cleats; and positive sheet feeding means movable independently of the cleat feeding means.

11. A machine for use in making wire-bound cleat reinforced boxes comprising, in combination, fastener-setting mechanism for securing binding wire to a succession of box sections progressively subjected to the action thereof; means to space successive sections; cleat feeding means; and a separate and independent sheet feeding means adapted to feed sheets synchronously with cleats.

12. A machine for use in making wire-bound cleat reinforced boxes comprising, in combination, fastener-setting mechanism for securing binding wire to a succession of box sections progressively subjected to the action thereof; means to space successive sections; cleat feeding means; and a separate and independent sheet feeding means, said two means being independently movable but constructed and arranged to feed cleats and sheets synchronously.

13. A machine for use in making wire-bound cleat reinforced boxes comprising, in combination, a work support; fastener-setting mechanism for applying binding wire to box parts; means to space cleats; separate and independent sheet spacing means; cleat feeding means; and sheet feeding means movable independently of the cleat feeding means.

14. In a machine for use in making wire-bound boxes, the combination of cleat feeding means and a separate and independent sheet feeding means controlled by the movement of the cleats.

15. In a machine for use in making wire-bound boxes, the combination of cleat feeding means and sheet feeding means, the latter means being actuated by the movement of the cleats.

16. In a machine for use in making wire-bound boxes, the combination of cleat feeding means; actuating means therefor; and sheet feeding means controlled by the cleats.

17. A machine for use in making wire-bound, cleat-reinforced boxes comprising, in combination, a work support; fastener-setting mechanism for applying binding wire to box parts; means to space cleats; separate and independent sheet-spacing means; cleat-feeding means; and separate and independent sheet-feeding means.

In witness whereof I have hereunto set my hand at Indianapolis, Indiana, this 13th day of December, A. D. 1919.

FREDERICK J. GRUMME.